(12) United States Patent
McCollough et al.

(10) Patent No.: US 9,196,168 B2
(45) Date of Patent: Nov. 24, 2015

(54) COLLISION AVOIDANCE AND WARNING SYSTEM

(75) Inventors: James McCollough, Arlington, TX (US); Christos Bais, Keller, TX (US)

(73) Assignee: Textron Innovations Inc., Providence, RI (US)

( * ) Notice: Subject to any disclaimer, the term of this patent is extended or adjusted under 35 U.S.C. 154(b) by 379 days.

(21) Appl. No.: 12/469,238

(22) Filed: May 20, 2009

(65) Prior Publication Data

US 2010/0299067 A1 Nov. 25, 2010

(51) Int. Cl.
*G08G 5/04* (2006.01)
*G01S 13/93* (2006.01)

(52) U.S. Cl.
CPC .............. *G08G 5/04* (2013.01); *G01S 13/9303* (2013.01)

(58) Field of Classification Search
CPC ....................... G06Q 30/06–30/08; G06Q 5/04
USPC .......................................................... 701/301
See application file for complete search history.

(56) References Cited

U.S. PATENT DOCUMENTS

| | | | | |
|---|---|---|---|---|
| 4,528,564 | A * | 7/1985 | Trampnau | 340/946 |
| 5,371,581 | A | 12/1994 | Wangler | |
| 5,371,851 | A | 12/1994 | Pieper et al. | |
| 5,872,526 | A * | 2/1999 | Tognazzini | 340/961 |
| 5,945,926 | A * | 8/1999 | Ammar et al. | 340/970 |
| 6,002,348 | A * | 12/1999 | Greene et al. | 340/963 |
| 6,278,409 | B1 * | 8/2001 | Zuta | 343/756 |
| 6,282,488 | B1 * | 8/2001 | Castor et al. | 701/120 |
| 6,294,985 | B1 * | 9/2001 | Simon | 340/435 |
| 6,385,513 | B1 | 5/2002 | Murray et al. | |
| 6,556,282 | B2 * | 4/2003 | Jamieson et al. | 356/4.01 |
| 6,737,987 | B2 * | 5/2004 | Conner et al. | 340/946 |
| 6,785,594 | B1 | 8/2004 | Bateman | |
| 6,906,641 | B2 * | 6/2005 | Ishihara | 340/946 |
| 7,019,682 | B1 | 3/2006 | Louberg et al. | |
| 7,095,488 | B2 * | 8/2006 | Jamieson et al. | 356/5.01 |
| 7,136,011 | B2 * | 11/2006 | Mork et al. | 342/29 |
| 7,239,266 | B2 * | 7/2007 | Vacanti | 342/120 |

(Continued)

FOREIGN PATENT DOCUMENTS

DE 102007014878 A1 10/2008
EP 1163534 B1 * 9/2009

(Continued)

OTHER PUBLICATIONS

International Preliminary Report on Patentability in related PCT Application PCT/US10/35226, generated by the IPEA/US, dated Nov. 7, 2011, 6 pages.

(Continued)

*Primary Examiner* — Ethan D Civan
(74) *Attorney, Agent, or Firm* — James E. Walton

(57) ABSTRACT

A collision avoidance and warning system for a helicopter uses a type of emitted energy, for example radio frequency radar, from a transceiver positioned to cover a selected field of view for detecting an object or pedestrian in the vicinity of the helicopter. For helicopters that include a tail rotor assembly, the selected field of view can include a region around the tail rotor assembly so that when the helicopter is running on the ground, an alarm can be issued to persons approaching the tail rotor assembly. When the helicopter is in flight, the collision avoidance and warning system can alert the pilot when a portion of the helicopter outside of the pilot's field of view is in danger of a collision with an object.

16 Claims, 4 Drawing Sheets

(56) References Cited

U.S. PATENT DOCUMENTS

| | | | |
|---|---|---|---|
| 7,397,363 B2 | 7/2008 | Joao | |
| 7,529,621 B2* | 5/2009 | Reuveni et al. | 701/301 |
| RE41,153 E* | 3/2010 | Mork et al. | 342/29 |
| 7,672,758 B2* | 3/2010 | Astruc | 701/16 |
| 7,751,976 B2* | 7/2010 | Matuska et al. | 701/301 |
| 7,839,322 B2* | 11/2010 | Filias et al. | 342/33 |
| 7,982,662 B2* | 7/2011 | Shaffer | 342/158 |
| RE42,708 E* | 9/2011 | Mark et al. | 342/29 |
| 8,373,588 B2* | 2/2013 | Kuhn | 342/20 |
| 8,401,774 B2* | 3/2013 | Ravenscroft et al. | 701/120 |
| 2004/0059504 A1* | 3/2004 | Gray | 701/301 |
| 2005/0173594 A1* | 8/2005 | Viebahn et al. | 244/118.5 |
| 2006/0089759 A1* | 4/2006 | Becker | 701/3 |
| 2006/0290531 A1* | 12/2006 | Reynolds et al. | 340/961 |
| 2007/0050140 A1 | 3/2007 | Matuska et al. | |
| 2007/0273556 A1* | 11/2007 | Gyde et al. | 340/945 |
| 2008/0062011 A1* | 3/2008 | Butler et al. | 340/961 |
| 2009/0164122 A1* | 6/2009 | Morbey | G08G 5/0021 701/301 |
| 2010/0109936 A1* | 5/2010 | Levy | 342/30 |
| 2010/0191450 A1* | 7/2010 | Ravenscroft et al. | 701/120 |
| 2010/0214148 A1* | 8/2010 | Kuhn | 342/20 |
| 2011/0006943 A1* | 1/2011 | Shaffer | 342/146 |
| 2011/0066304 A1* | 3/2011 | Taylor | 701/2 |
| 2011/0178711 A1* | 7/2011 | Christoph | 701/301 |

FOREIGN PATENT DOCUMENTS

| | | |
|---|---|---|
| WO | 2007024635 A2 | 3/2007 |
| WO | 2008065658 A1 | 6/2008 |

OTHER PUBLICATIONS

Extended European Search Report from the European Patent Office in related European Application No.: 10778248, mailed Oct. 24, 2012, 8 pages.

Chinese office action in related Chinese patent application No. 2010800223654, 7 pages, mailed Jul. 2, 2013.

Examination report in related Canadian patent application No. 2762287, 3 pages, mailed Feb. 5, 2014.

Examination report in related Chinese patent application No. 201080022365.4, 7 pages, mailed Feb. 8, 2014.

Office Action dated Jul. 18, 2014 from counterpart CN App. No. 2010800223654.

Office Action dated Feb. 18, 2015 from counterpart CA App. No. 2,762,287.

Office Action dated Feb. 5, 2015 from counterpart CN App. No. 2010800223654.

* cited by examiner

COLLISION AVOIDANCE AND WARNING SYSTEM

BACKGROUND

1. Field of the Invention

The present application relates to systems for detecting a probable collision and issuing an alert regarding the probable collision.

2. Description of Related Art

Many helicopters use a tail rotor anti-torque system. On many such helicopters, the tail rotor is positioned close enough to the ground that it presents an extremely dangerous hazard to nearby personnel while the helicopter engine is running (and the rotor is turning). Also, during low-level flight, there is a risk of a tail rotor strike with the ground, ground structures, vegetation, or personnel, due in part to the difficulty or inability of a pilot to see the tail rotor and the immediate area around the tail rotor.

Because of these known problems, various efforts have been made to reduce the risk of injury and damage caused by tail rotor strikes. However, it is also important to take steps towards reducing impacts with other portions of an aircraft, particularly those that are difficult for the pilots to see such as the empennage or tail boom of a helicopter.

The primary method currently employed for avoiding rotor strikes uses a mechanical guard to impact an obstacle and transfer the energy to a less susceptible structure point on the helicopter. This method is disadvantageous due to the fact that an actual impact will still occur and this method is limited to preventing only certain types of impacts. For example, a tail stinger will only transfer energy if the stinger is impacted first; the tail stinger provides minimal protection for an impact from the side or above. A mechanical guard also serves to deter a person from moving into the danger zone of a tail rotor. However, there is still a disadvantage to this method since a person may still come into contact with the guard before their movement into the danger zone is impeded. Also, not all angles of approach are impeded by most mechanical guards.

Another method of reducing tail rotor strikes has involved various high-visibility paint schemes designed to make a turning tail rotor more visible. Outfitting tail rotors with high-visibility paint schemes has resulted in a decrease in the number of accidents due to persons walking into an operating tail rotor; however, this method is not effective in low-light or dark conditions or for preventing the helicopter from flying into obstacles.

Still further methods, such as disclosed in U.S. Pat. No. 5,371,581 to Wangler et al. titled "Helicopter Obstacle Warning System," involve the use of a laser-based detector mounted in a location on the helicopter suitable for detecting an obstacle near the tail rotor. However, this method disadvantageously relies on optics that are prone to degraded performance in dust or other environments where the optical lenses of the system can be obscured by particulate matter in the air. The device shown is also mounted on the underside of the aircraft, limiting its field of view and can be greatly obscured by dust or other vegetation as part of an unprepared landing site. The method also relies on a mechanical device to rotate the optics. Laser-based technology can also be attenuated or blinded by certain types of particulate (i.e. snow). Laser energy can also see higher reflectivity due to a high density of particulate, making it prone to errors, false alarms, or non-alert due to blinding.

Hence, there is a need for an improved system for detecting obstacles near the tail rotor and avoiding tail rotor strikes.

DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

DETAILED DESCRIPTION OF THE PREFERRED EMBODIMENT

Figure 1:
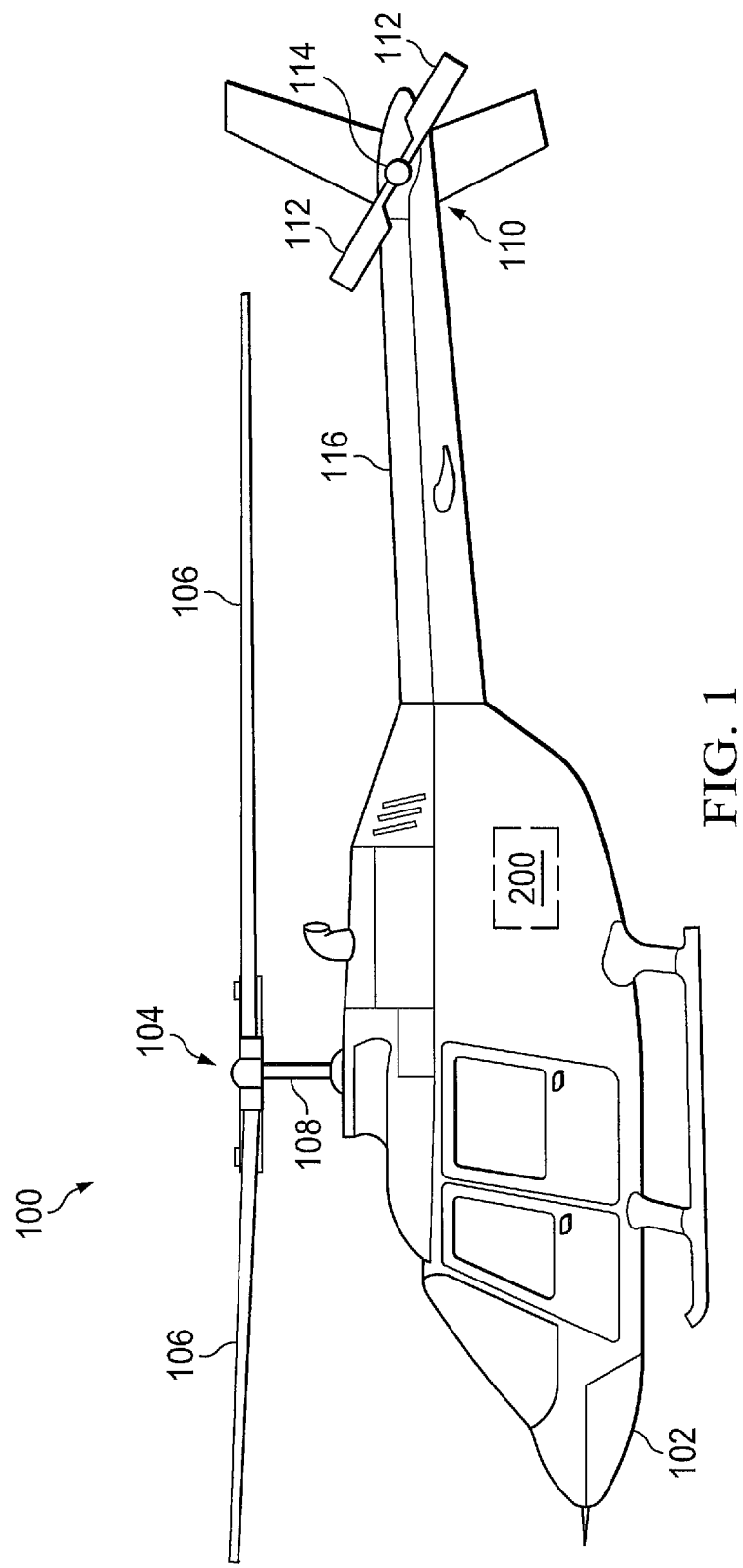
FIG. 1 shows a side view of a helicopter having a collision avoidance and warning system.

Referring to FIG. 1 in the drawings, a helicopter 100 having a collision avoidance and warning system, generally designated as system 200, according to the present disclosure is illustrated. It will be appreciated that system 200 can include multiple sub-elements that are dispersed within the helicopter 100 rather than all located in a single location. Helicopter 100 has a fuselage 102 and a main rotor assembly 104, including main rotor blades 106 and a main rotor shaft 108. Helicopter 100 has a tail rotor assembly 110, which serves as an example of an anti-torque system. The tail rotor assembly 110 includes tail rotor blades 112 and a tail rotor shaft 114. Main rotor blades 106 generally rotate about a longitudinal axis of main rotor shaft 108. Tail rotor blades 112 generally rotate about a longitudinal axis of tail rotor shaft 114. Main rotor blades 106 and tail rotor blades 112 are driven by a drive means (not shown) carried by fuselage 102. Torque is transmitted from the drive means to the tail rotor assembly 110 through at least one drive shaft (not shown) that is disposed within a tail boom 116.

The presently disclosed collision avoidance and warning system 200 can also be utilized on other types of rotary wing aircraft. It should be understood that the present presently disclosed collision avoidance and warning system 200 can be used with any aircraft on which it would be desirable to have a collision avoidance and warning system 200 as described herein, including unmanned aerial vehicles that are remotely piloted and aircraft that include other types of anti-torque systems or that do not require an anti-torque system.

Figure 2:
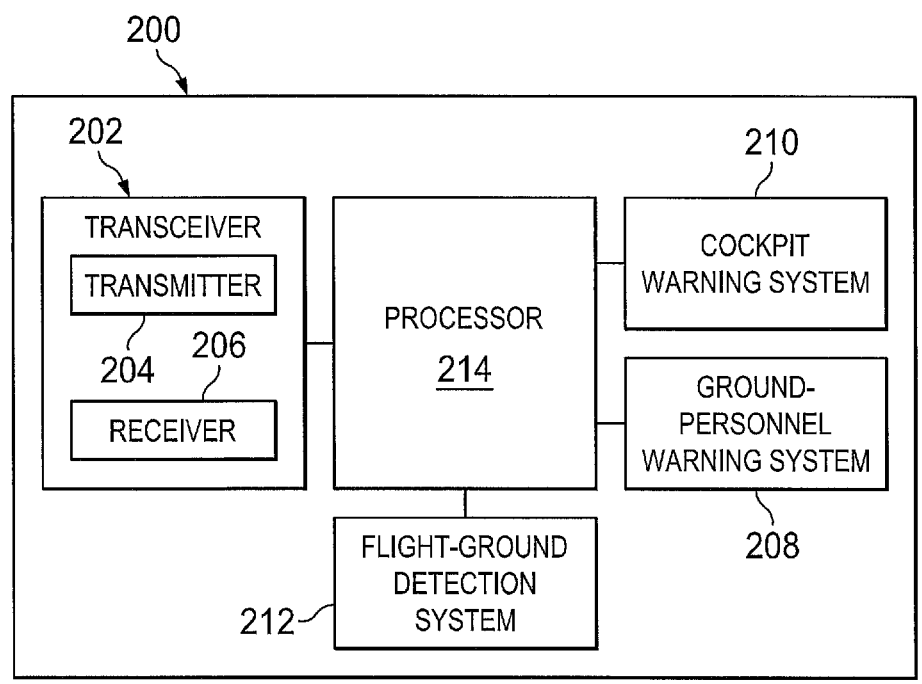
FIG. 2 is a block diagram of the collision avoidance and warning system.

Referring next to FIG. 2 in the drawings, a block diagram of collision avoidance and warning system 200 is illustrated. Collision avoidance and warning system 200 comprises a transceiver 202 having a transmitter 204 for transmitting radio waves and a receiver 206 for receiving reflected radio waves from the radio waves transmitted by the transmitter 204. Thus, the transceiver 202 is essentially a short range radar system that preferably uses radio frequency waves, although other types of radar and other frequency ranges can be used. Radar offers additional advantages in that it can be mounted behind different structures and materials that are considered transparent to the radar energy signal, thus allowing a system not to be exposed directly to the outside environment of the helicopter 100. This allows for the sensor to be potentially mounted in such a way that it does not impact the aerodynamic features of the exterior surfaces of an aircraft or pose an eye sore.

In some embodiments, the transceiver 202 can include multiple transmitters 204 and multiple receivers 206 and/or the system 200 can include multiple transceivers 202 each including one or more transmitters 204 and receivers 206. In some such embodiments, the one or more transceivers 202, transmitters 204, and receivers 206 can be in communication with each other. For example, such a configuration can allow for a receiver 206 of a first transceiver 202 to receive reflected radio waves from the radio waves transmitted by a transmitter 204 of a second transceiver 202 such that the system 200 recognizes that the reflected radio waves received by the first transceiver 202 were transmitted by the second transceiver 202.

Collision avoidance and warning system 200 also comprises a ground-personnel warning signal system 208 for issuing a ground-personnel warning signal to ground personnel, and a cockpit warning signal system 210 for issuing a cockpit warning signal to a pilot of the helicopter 100. Collision avoidance and warning system 200 also comprises a flight-ground detection system 212 for detecting whether the helicopter 100 is on the ground or in flight. Collision avoidance and warning system 200 further comprises a processor 214, which serves as an example of a data processor.

Processor 214 is in communication with transceiver 202, flight-ground detection system 212, ground-personnel warning signal system 208, and cockpit warning signal system 210. Processor 214 is configured for processing data received from the transceiver 202 and data received from the flight-ground detection system 212 for determining whether to activate one or both of the ground-personnel warning signal system 208 and the cockpit warning signal system 210. When the ground-personnel warning signal system 208 is activated by the processor 214, the ground-personnel warning signal system 208 is configured to issue a ground-personnel warning signal. Similarly, when the cockpit warning signal system 210 is activated by the processor 214, the cockpit warning signal system 210 is configured to issue a cockpit warning signal.

Figure 3:
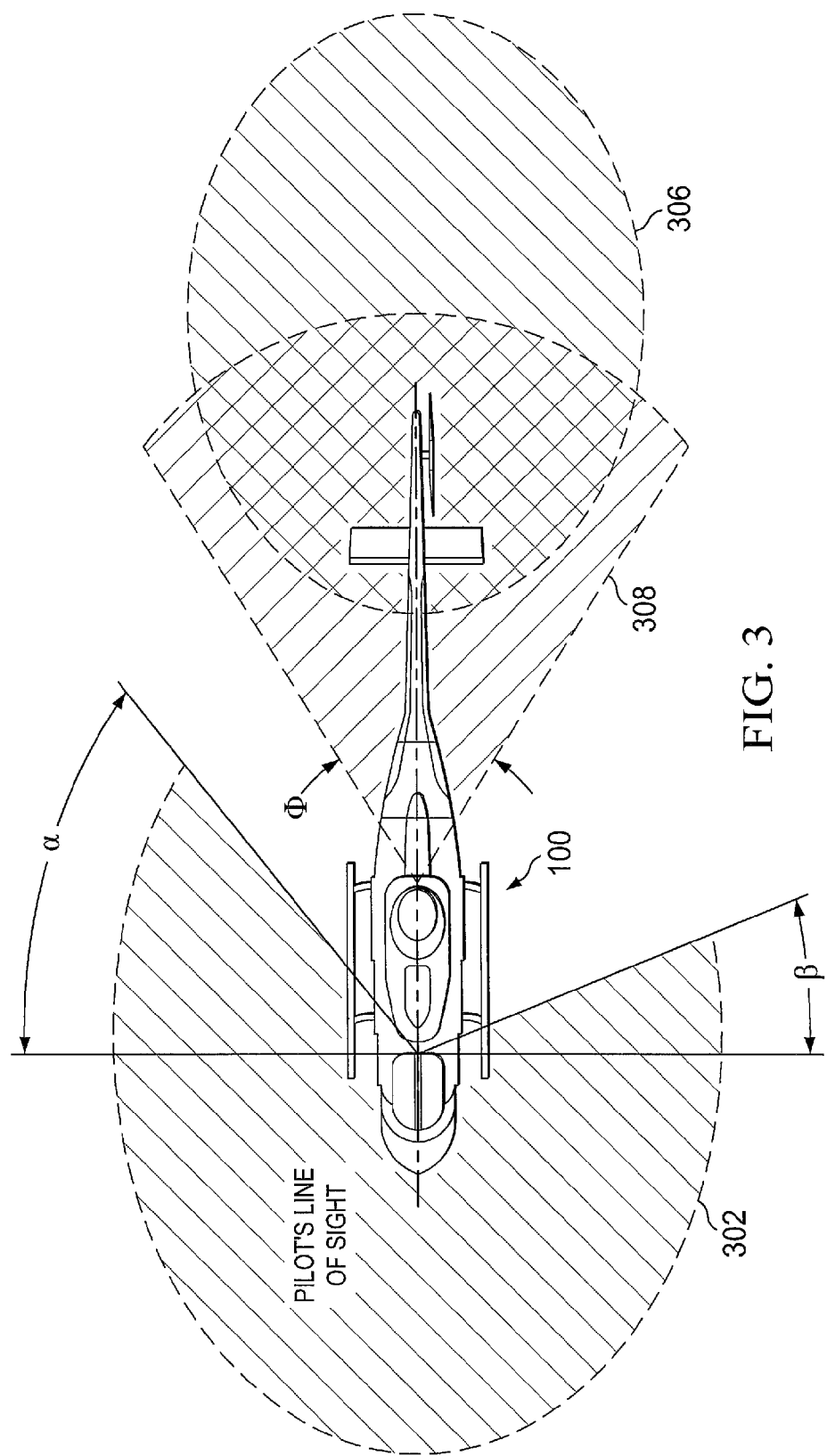
FIGS. 3 and 4 show respective top views of the helicopter shown in FIG. 1 showing various regions of interest around the helicopter.
Figure 4:
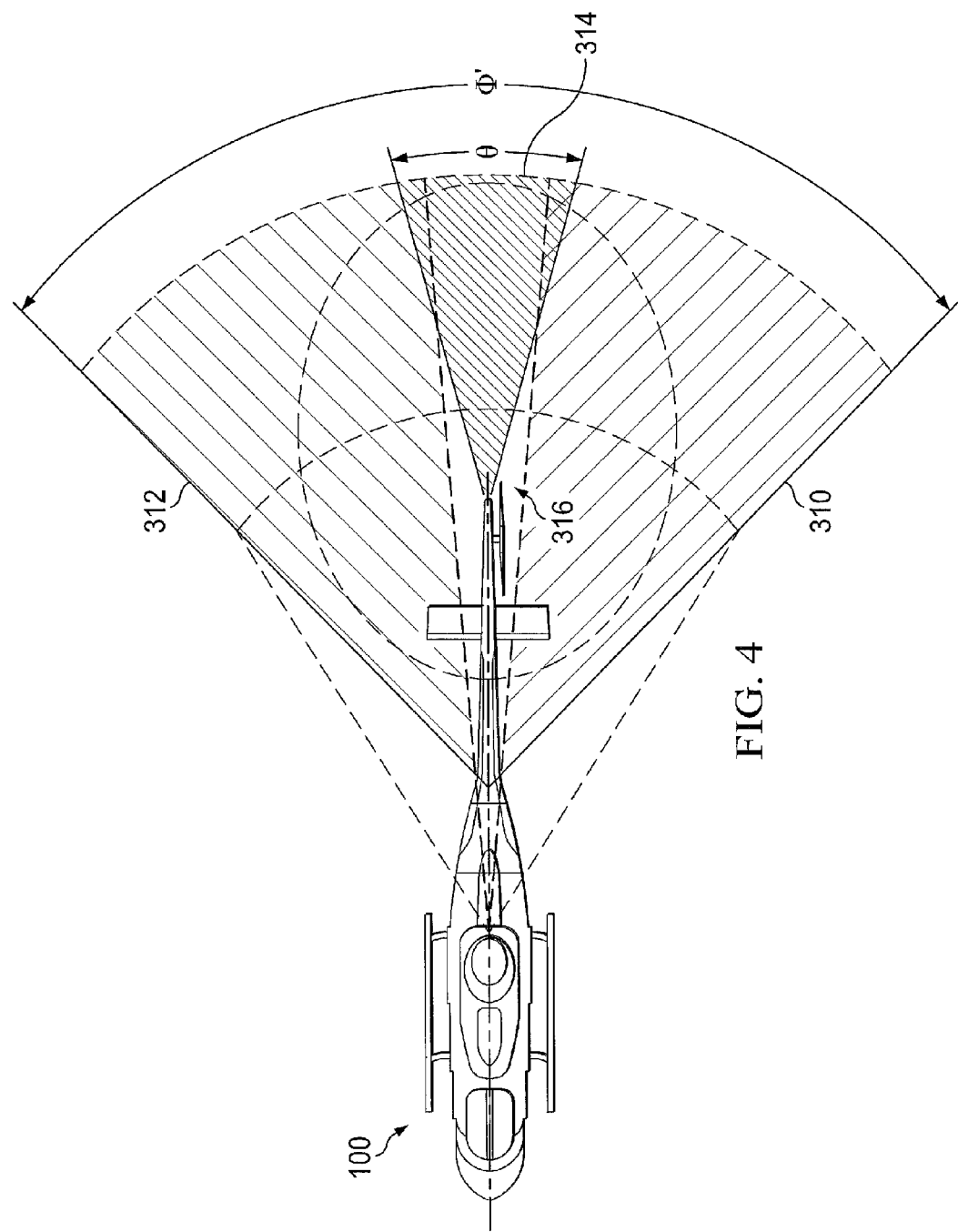

Referring now also to FIGS. 3 and 4, which show respective a plan views of helicopter 100. While the particular helicopter 100 is shown as a helicopter having a pilot positioned in the right seat, it should be appreciated that the present description applies equally to other helicopters where the pilot may be seated in the left seat and where there may be pilots in both the right and left seats. The hatched region 302 shows the pilot's field of view for the helicopter 100, which includes the region forward of the pilot, the region within some angle α aft of the pilot on the pilot's side of the helicopter 100, and the region within inside some angle β aft of the pilot on the co-pilot's side of the helicopter 100. It should be appreciated that these regions and angles can vary depending on the model of helicopter and pilot positioning. In the model of helicopter 100 shown in FIG. 3, the angle α is approximately 43 degrees, and the angle β is approximately 15 degrees. The circular region 306 depicts a preferred detection zone for a person or obstacle while the helicopter 100 is on the ground. For example, a rearward facing receiver 206 can be configured to have an approximate field of view shown by hatched region 308 (within the arc having an angle $\phi$).

In addition, or alternatively, one or more receivers 206 can be configured to have other fields of view, for example for protecting from impacts during sideward flight, rearward, and yawing flight during hover. For example, the embodiment shown in FIG. 4 includes a first receiver 206 for sensing reflected waves in region 310, a second receiver for sensing reflected waves in region 312, and a third receiver for sensing reflected waves in region 314. The receivers 206 associated with regions 310 and 312 are rotated outwardly leaving an unsensed region 316. This arrangement allows for a greater angle of detection $\phi'$ compared to angle $\phi$ shown in FIG. 3.

The hatched region 314 (within the arc having an angle θ) depicts a preferred approximate field of view of receiver 206 (or at least one receiver 206 in embodiments having multiple receivers 206) in order to provide for obstacle detection and avoidance during rearward flight.

For many years, serious accidents have occurred due to people walking into tail rotors that are turning while the helicopter is on the ground, or due to hovering helicopters striking ground objects. The collision avoidance and warning system 200 addresses both of these problems. Since the pilot has only a limited field of view 302, there is a measurable blind spot. The collision avoidance and warning system 200 uses emitted energy (such as short range radar) from one or more transmitters 204 positioned to cover hazard regions 306 and/or 308 shown in FIG. 3. The emitted energy can be emitted by the one or more transmitters 204 in the form of a single pulse, multiple pulses, or a continuous wave. Reflected energy received by one or more receivers 206 is used to detect objects near or approaching the tail rotor assembly 110.

Collision avoidance and warning system 200 is a smart system having a flight-ground detection system 212 designed to use collective pitch position, weight-on-gear switch, radar altimeter, and/or other inputs as available to determine whether the helicopter 100 is on the ground or in the air. When on the ground, an aural warning at a pitch designed to be heard over the sound of the helicopter 100 is emitted to the approaching pedestrian by ground-personnel warning system 208 preferably located near the tail rotor assembly 110. When the helicopter 100 is not on the ground, the cockpit warning system 210 issues an aural warning alarm or warning message (for example using a voice synthesizer) directly to the pilot's headset. In some embodiments, other types of warnings in addition to, or alternatively, can be initiated by the ground-personnel warning system 208 and/or the cockpit warning system 210, including visual warnings such as warning lights and tactile warnings such as vibrating pedals.

Threshold warning ranges can be established to allow a moving pedestrian as much time as possible to stop prior to contacting an obstacle with the tail rotor assembly 110. The processor 214 uses such threshold warning ranges in combination with data representative of detected objects (objects that reflected radio waves transmitted by transmitter 204) to determine whether an alert needs to be issued.

In some embodiments, the processor 214 can use data representative of whether the helicopter 100 is on the ground or in the air received from the flight-ground detection system 212 in combination with data representative of persons or objects in the hazard region from the transceiver 202 in determining whether a warning signal should be issued. In some embodiments, the criteria used by the processor in determining whether a warning signal should be issued can be different depending on whether the helicopter is on the ground or in the air. For example, if the helicopter 100 is in the air, the processor 214 can use distance in terms of time to impact with an object detected by the transceiver 202 as a basis for determining whether to issue a warning signal to the pilot. If the helicopter 100 is on the ground, the processor 214 can use the speed of an approaching pedestrian detected by the transceiver 202 as a basis for determining whether to issue a warning signal to ground personnel.

Collision avoidance and warning system 200 can be capable of measuring the distance, speed, and angle to detect the potential path of the obstacle, both on ground and in the air to determine the necessity to trigger the alert. The system 200 may not require all three parameters to make a decision, but can use the parameters to make the best decision.

The processor 214 determines the type of alert to issue based on data received from the flight-ground system 212 regarding whether the helicopter 100 is on the ground or in the air. If the helicopter 100 is on the ground, the processor 214 issues data to the ground-personnel warning system 208 instructing the ground-personnel warning system 208 to issue a ground-personnel warning signal, such as the above-described aural alarm. On the other hand, if the helicopter 100 is in the air, the processor 214 issues data to the cockpit warning system 210 instructing the cockpit warning system 210 to issue a cockpit warning signal to the pilot, such as the above-described aural alarm.

In some embodiments, the ground-personnel warning system 208 can be configured to transmit a warning signal (e.g., via Bluetooth) that can be received by a headset worn by ground personnel to warn of close proximity to the tail rotor assembly 110.

While portions of the present description focus on protecting the tail rotor assembly 110 and protecting personnel from an impact with the tail rotor assembly 110, alternative embodiments can involve other parts of an aircraft, particularly where the aircraft does not include a tail rotor assembly 110, or may not include any type of anti-torque system.

It is apparent that an invention with significant advantages has been described and illustrated. Although the present application is shown in a limited number of forms, it is not limited to just these forms, but is amenable to various changes and modifications without departing from the spirit thereof.

What is claimed is:

1. A collision avoidance and warning system for an aircraft, comprising:
   a transceiver having a transmitter for transmitting radio waves and a receiver for receiving reflected radio waves from the radio waves transmitted by the transmitter, the transceiver being located on the aircraft;
   a ground-personnel warning signal system comprising;
      a speaker located near a region outside a pilot's field of view for audibly alerting ground personnel; and
      a light located near the region outside the pilot's field of view for visually alerting ground personnel;
   wherein the ground-personnel warning system is located on the aircraft for selectively issuing a ground-personnel warning signal to ground personnel from equipment worn by a detected person when the aircraft is on the ground;
   a flight-ground detection system located on the aircraft for determining whether the helicopter is on the ground or in flight; and
   a data processor located on the aircraft and configured to process data received from the transceiver and data received from the flight-ground detection system while the aircraft is in flight and on the ground, the data processor configured to selectively initiate an alert from the ground-personnel warning signal system to issue a ground-personnel warning signal based upon the flight-ground detection system determination of flight status;
   wherein the transmitter of the transceiver is configured for transmitting radio waves towards the region outside the pilot's field of view; and
   wherein the flight-ground detection system comprises;
      a weight-on-gear switch;
      a collective pitch position sensor; and
      a radar altimeter.

2. The system of claim 1, wherein the region outside the pilot's field of view comprises at least one rotor having blades attached thereto.

3. The system of claim 1, wherein the receiver of the transceiver is configured for receiving reflected radio waves from the radio waves transmitted towards the region outside the pilot's field of view.

4. The system of claim 1, wherein the data processor is configured to determine whether to activate one of said ground-personnel warning signal system based at least in part on data from the flight-ground detection system representative of whether the aircraft is on the ground or in flight.

5. The system of claim 1, wherein the data processor is configured to determine whether said ground-personnel warning signal should be issued based at least in part on data from the flight-ground detection system representative of whether the aircraft is on the ground or in flight.

6. The system of claim 1, wherein the ground-personnel warning signal includes at least one of a visual warning signal and an audible warning signal at a preselected frequency, the frequency being preselected based at least in part on a noise signature of the aircraft during operation.

7. The system of claim 1, further comprising a second transceiver having a second transmitter for transmitting radio waves and a second receiver for receiving reflected radio waves from the radio waves transmitted by the second transmitter, the transceiver being supported by the aircraft.

8. The system of claim 1, further comprising a second transceiver having a second transmitter and a second receiver, wherein the second receiver is configured for receiving radio waves from radio waves transmitted by at least one of the first and second transmitters.

9. A method of collision avoidance and warning for use on an aircraft, comprising:
   transmitting radio waves from a transmitter, the transmitter being supported by the aircraft;
   receiving, at a receiver supported by the aircraft, reflected radio waves from the radio waves transmitted by the transmitter;
   generating transceiver data based at least in part on the received reflected radio waves while the aircraft is in flight and on the ground;
   detecting whether the aircraft is on the ground or in flight;
   detecting whether ground personnel are located in a region adjacent outside a pilot's field of view;
   generating flight-ground detection data based at least in part on said detecting whether the aircraft is on the ground or in flight;
   generating ground personnel detection data based at least in part on said detecting whether ground personnel are located in the region adjacent outside the pilot's field of view;
   processing the transceiver data, the ground personnel detection data, and the flight-ground detection data within a data processor located on the aircraft; and
   selectively initiating a warning signal from a ground-personnel warning signal system as determined by the data processor based upon the flight-ground detection system determination of flight status and the ground personnel detection data, the ground-personnel warning signal system issuing the warning signal when the aircraft is on the ground, the ground-personnel warning signal system is located on the aircraft;
   wherein the ground-personnel warning signal is selectively transmitted from equipment worn by a detected person;
   wherein the transmitting includes transmitting radio waves towards the region adjacent outside the pilot's field of view; and wherein the detecting of whether the aircraft is on the ground or in flight includes detecting the collective pitch position, using a radar altimeter, and using a weight-on-gear switch.

10. The method of claim 9, wherein the region adjacent outside the pilot's field of view comprises at least one rotor having blades attached thereto.

11. The method of claim 9, wherein the receiving includes receiving reflected radio waves from the radio waves transmitted towards the region outside a pilot's field of view.

12. The method of claim 9, further comprising determining whether to activate said ground-personnel warning signal system based at least in part on data representative of whether the aircraft is on the ground or in flight.

13. The method of claim 9, further comprising determining whether said ground-personnel warning signal should be issued based at least in part on data representative of whether the aircraft is on the ground or in flight.

14. The method of claim 9, wherein the ground-personnel warning signal includes at least one of:
   a visual warning signal emitted from the aircraft;
   an audible warning signal emitted from the aircraft at a preselected frequency, the frequency being preselected based at least in part on a noise signature of the aircraft during operation;
   an audible warning signal emitted from within equipment worn by the detected person; and
   a visual warning signal emitted from within equipment worn by the detected person.

15. The method of claim 9, further comprising:
   transmitting radio waves from a second transmitter supported by the aircraft; and
   receiving, at a second receiver supported by the aircraft, reflected radio waves from the radio waves transmitted by the second transmitter.

16. The method of claim 9, further comprising:
   receiving, at a second receiver supported by the aircraft, reflected radio waves from radio waves transmitted by at least one of the first transmitter and a second transmitter supported by the aircraft.

\* \* \* \* \*